Patented Sept. 2, 1930

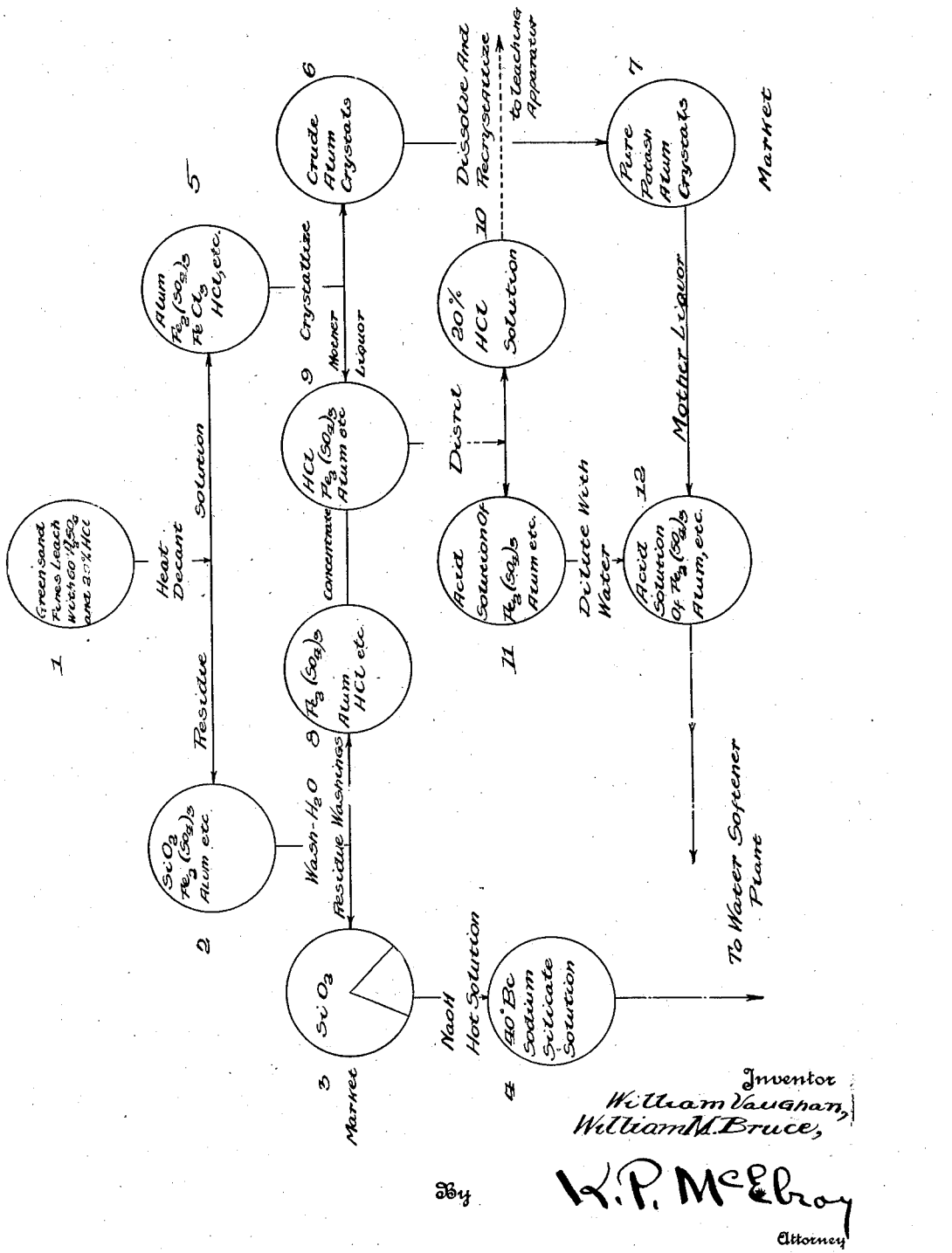

1,774,533

UNITED STATES PATENT OFFICE

WILLIAM VAUGHAN, OF MOUNT HOLLY, NEW JERSEY, AND WILLIAM M. BRUCE, OF NEW YORK, N. Y., ASSIGNORS TO THE PERMUTIT COMPANY, OF NEW YORK, N. Y., A CORPORATION OF DELAWARE

UTILIZATION OF GREENSAND

Application filed June 3, 1927. Serial No. 196,202.

This invention relates to the utilization of greensand; and it comprises a process wherein valuable materials are prepared from greensand or glauconite in an economical manner by extracting finely divided greensand which is advantageously the fines resulting as a byproduct in obtaining granular glauconite with a hot mixture of sulfuric and hydrochloric acids to form a solution from which potash alum may be crystallized, and a residue which may be washed to obtain silica freely soluble in alkali to make a solution of alkali silicate, the crystallization liquors and washing liquors being distilled to recover hydrochloric acid which may be returned to the system, leaving a residual liquor which may advantageously be employed in treating said granular greensand or glauconite to prepare it for water softening uses; all as more fully hereinafter set forth and as claimed.

Greensand, or glauconite, is a mineral found extensively throughout the United States, and particularly in New Jersey. It occurs in the form of granules and is probably a complex salt, being a double silicate of iron and potassium, containing also a large amount of alumina, with traces of other bases such as lime and magnesia. It has been used in a natural state as a fertilizer, and many attempts have been made to extract the potash which imparts to the greensand its value for such purposes. These attempts have not, however, met with commercial success, as the cost of manufacture by the methods so far proposed is in excess of the normal sales value of the potash to be recovered. It has proved impracticable to produce byproducts of commercial value to aid in meeting the cost of manufacture.

Glauconite is possessed of water softening properties and it now finds wide industrial application for this purpose. For this purpose, glauconite is required in granular form and fines and undersized granules are not used. The granules are treated in various ways prior to use. One such way involves treatments with sodium silicate and acid-reacting chemicals. The glauconite is washed and afterwards treated with a solution of alkali or of an alkaline silicate, or both. This operation removes humus and certain other impurities. As it is not desirable to leave the glauconite in an alkaline condition the treatment is usually followed by one with a weak acid or an acid reacting chemical such as ferric sulfate, aluminum sulfate, etc. The use of these acid reacting salts is better than the use of the weak acids as involving less liability to loss of material. This method of preparing a base-exchange water softening material entails the use of a plurality of solutions of chemicals, and the discarding of a high percentage of the greensand excavated. These features, of course, indicate increased operating costs, with resultant increase in the cost of the finished water softening material.

In the present invention, we have developed a process by means of which the active fertilizing principle of greensand (potash) is recovered in a commercially valuable form as potash alum of high grade, practically free from iron, and wherein silica of high grade is also prepared. The process is characterized by treating the greensand with a mixture of sulfuric and hydrochloric acids, with crystallization of alum from the extract and subsequent recovery of the hydrochloric acid, leaving a residual solution which may be utilized in the manufacture of water softening materials in the above described process. The process may be applied to any type of greensand, but is particularly useful in connection with the fines above mentioned. It will be seen, therefore, that all of the products of the process possess utility and that the byproducts may also be employed to advantage, thus rendering the process one involving a minimum of cost.

The accompanying drawing illustrates a flow sheet or diagram of the principal steps performed in one embodiment of the invention. The course of operation is illustrated by arrows and circles.

While large or small granules of greensand may be treated, we prefer to use the discarded fines from preparing glauconite for water softening purposes. This waste material consists of greensand granules which will pass a 50 mesh sieve; granules larger than this being desired for water softening purposes. In the process illustrated in the flow sheet, the fines are subjected to a leaching or extracting treatment with a hot mixture of sulfuric and hydrochloric acids, which advantageously may be used in the ratios of 2 parts by volume of 20 per cent HCl and 1 part by volume of commercial 60° Baumé sulfuric acid. About 10 gallons of the hot acid mixture is employed for every cubic foot of fine glauconite. The exact amount of acid used depends upon the composition of the glauconite. We proportion the acid so as to have an amount of $H_2SO_4$ equivalent to the bases present. The two acids may be mixed and added to the fines but we find it better as a rule to use the hydrochloric acid first and allow some reaction and then add the sulfuric acid. Considerable heat is developed when the sulfuric acid joins the mixture of glauconite and acid and this heat is useful. Frequently we run the surfuric acid into the mixture rather gradually, say, over a period of 20 to 30 minutes. This successive addition of acids has the advantage of minimizing escape of HCl as gas from the hot system. The hot mixed acids and the glauconite are kept in contact sufficiently long to give a clean extraction; i. e., so that the undissolved silica is pure except for the trace of organic matter it ordinarily carries.

When the extraction is complete, the liquor or solution formed is drawn off or decanted, leaving a wet residue consisting essentially of somewhat porous silica wet with remaining acid liquid. The solution contains alum, iron sulfate, chlorides, etc. The residue is washed with water, which may be cold or warm, the least quantity being used in order to confine the volume of the washings within reasonable limits. The washings are subsequently united with the solution liquor, as described fully hereinafter.

The residue from the washing treatment is a high grade silica, which may be marketed as such and used for making heat insulating bricks, filtering media, etc., but more advantageously it is dissolved in caustic soda solution to form a 40° Baumé solution of sodium silicate (waterglass). As stated, it may contain a little organic matter and if this is disadvantageous or its removal is wanted, the silica may be first washed with a little dilute caustic soda solution which will remove humus, etc., without much loss of silica. We have found that the silica left after extraction, leaching and washing is sufficiently soluble in alkali to make its use for this purpose highly advantageous. The solubility in alkali is sufficiently great to render possible the manufacture of waterglass solutions containing a high ratio of silica to alkali. When the process of the present invention is performed in connection with the manufacture of water softening materials we convert the silica into waterglass solution and employ it in the manufacture of water softening materials, thereby reducing the manufacturing costs of both processes. (Circles 3 and 4.)

The solution resulting from the leaching operation indicated in the circle 1 of the flow sheet contains a mixture of iron, aluminum, and potassium salts, present in the form of potassium-aluminum sulfate, ferric and ferrous sulfates, ferric and ferrous chlorids, etc. The solution is cooled, as indicated in circle 5, to effect the crystallization of potash alum or potassium-aluminum sulfate. The iron remains in solution in the mother liquor. This mother liquor contains a further quantity of alum which is regained in a following operation. The crop of crystals so obtained is redissolved in water and again crystallized, to form a crop of pure alum which may be marketed (circles 6 and 7).

The hydrochloric acid employed in the primary leaching operation has an important function in the formation of pure alum. Not only does it facilitate a clean extraction, but it also converts the iron into chlorids which do not interfere with the crystalization of alum in a pure form.

According to the process thus far described, there have been prepared in commercial form silica, sodium silicate, and alum, as represented by circles 3, 4, 6 and 7. In a further development of the process, the solutions and liquors resulting from such preparation are collected and treated to regain further quantities of alum and to recover hydrochloric acid, which is returned for use in treating further quantities of greensand fines.

The washings obtained by purifying the silica (circle 8) may be concentrated if their volume be too great, and are added to the mother liquor obtained from the first crystallization of the alum crystals (circles 6 and 9). The united solutions, which contain practically all of the original hydrochloric acid used, together with some alum and practically all of the iron, are subjected to a distilling treatment to separate the hydrochloric acid. This operation may be continued until all of the acid is removed, together with sufficient water to form a 20 per cent solution, which is then returned to the leaching process (circle 10). It will be seen, therefore, that there is no substantial loss of hydrochloric acid, which circulates in the system in closed cycle. In distilling off the HCl and water the liquid is concentrated and on cooling it gives a further crop of alum crystals which are sent back to join the crude alum coming from the first crystallization. The mother liquor separated from this alum still contains some dissolved alum and it may contain in addition either aluminum sulfate or potassium sulfate as the case may be.

Glauconite seldom contains alumina and potash in the exact ratio necessary for alum and whichever is in excess occurs in this liquor as a sulfate. With potash in excess it is often economical to add some aluminum sulfate and regain it as alum. With aluminum sulfate in excess it is often economical to add kainite or other cheap material containing KCl thereby incidentally replenishing the amount of HCl in circulation. On correcting the composition of the mother liquor and heating and cooling a further crop of alum crystals may be obtained. The mother liquor contains a considerable amount of iron sulfate. Sometimes it is worth while to utilize this iron sulfate in the formation of pigmentary products. The best use we have found for it however when the present invention is practiced in connection with the manufacture of water softening materials is to return it for use in the described treatment of the granular glauconite. It is an acid reacting liquid and can be used efficiently in treating glauconite granules. In so doing the process becomes cyclic in the sense that glauconite is separated into granules and fines and the fines used in preparing reagents for treating the granules to adapt them for water softening purposes.

It will be noted that the described process is a valuable auxiliary to a method of preparing glauconite for water softening purposes since it enables use of the discarded fines for preparing the chemicals necessary in this method. The value of the chemicals which can be prepared aids in meeting the cost of the method. The only raw materials necessary are sulfuric acid and caustic soda with a slight amount of HCl which may be required for replenishment.

In the extraction stage while other proportions of HCl and $H_2SO_4$ may be employed, we regard the proportions stated as being the most practical.

What we claim is:—

1. In the utilization of greensand, the process which comprises subjecting finely divided greensand to the action of a hot solution containing a mixture of sulfuric and hydrochloric acids.

2. In the utilization of greensand, the process which comprises subjecting finely divided greensand to the action of a hot solution containing a mixture of sulfuric and hydrochloric acids, separating the resulting solution from the insoluble products formed by such action, and treating the resulting solution to obtain hydrochloric acid therefrom.

3. In the utilization of greensand, the process which comprises subjecting finely divided greensand to the action of a hot solution containing a mixture of sulfuric and hydrochloric acids, separating the resulting solution from the insoluble products formed by such action, distilling hydrochloric acid from the resulting solution, and returning the acid thus obtained to the treatment of additional quantities of greensand.

4. In the utilization of greensand, the process which comprises subjecting finely divided greensand to the action of a solution containing a mixture of sulfuric and hydrochloric acids, heating to facilitate extraction, separating the residue from the resulting solution thus formed, washing the residue to purify the same, adding the washings to the solution resulting from the acid treatment, and distilling the collected solutions to regain the hydrochloric acid.

5. In the utilization of greensand, the process which comprises subjecting finely divided greensand to the action of a hot solution containing a mixture of sulfuric and hydrochloric acids, separating the residue from the resulting solution thus formed, cooling the solution to effect the crystallization of alum contained therein, and distilling the mother liquor thus obtained to regain hydrochloric acid.

6. In the utilization of greensand, the process which comprises subjecting finely divided greensand to the action of a hot solution containing a mixture of sulfuric and hydrochloric acids, separating the residue from the resulting solution thus formed, washing the residue to purify the same and thereby obtain pure silica, cooling the resulting solution to effect the crystallization of alum therefrom, uniting the washings obtained by purifying the residue with the mother liquor obtained by crystallizing the alum, distilling the collected body of liquor thus obtained, thereby obtaining a solution of hydrochloric acid.

7. In the utilization of glauconite, the process which comprises leaching glauconite with a solution of sulfuric and hydrochloric acids to give an alum-containing solution and a residue of pure silica and dissolving said silica in caustic soda.

8. In the utilization of glauconite, the process which comprises separating glauconite into granular materials and fines with subsequent treatment of the granules with silicate of soda and acid-reacting materials, extracting the fines with a solution of sulfuric and hydrochloric acids to prepare a resulting solution containing alum and acid-reacting bodies and leave a residue of pure silica, dissolving the residue in caustic soda to form silicate of soda and employing the silicate for the treatment of the granules in the appropriate stage of operation and concentrating the liquid extract to give crystals of alum and an acid mother liquor, and returning said mother liquor for use in treatment of the granules.

9. In the economic utilization of glauconite the process which comprises separating natural glauconite into granular material and fines, reserving the granular material for preparation of a water softening material, extracting the fines with acid to obtain an acid reacting liquid, dissolving the residue from the acid extraction in caustic soda to form a sodium silicate solution and treating the granular material with an acid liquid and sodium silicate solution derived from treatment of the fines in the described manner.

In witness whereof we have hereunto affixed our signatures.

WILLIAM VAUGHAN.
WILLIAM M. BRUCE.